United States Patent [19]

Ohkawa et al.

[11] 4,098,752

[45] Jul. 4, 1978

[54] THERMOPLASTIC RESIN COMPOSITION SUITABLE FOR EXTRUSION MOLDING

[75] Inventors: Hideo Ohkawa; Yoshinori Nagai; Shiro Kozakura; Yutaka Mugino; Noriki Fujimoto; Masami Tomikawa, all of Sodegaura, Japan

[73] Assignee: Idemitsu Kosan Company, Ltd., Tokyo, Japan

[21] Appl. No.: 810,743

[22] Filed: Jun. 28, 1977

Related U.S. Application Data

[63] Continuation of Ser. No. 597,560, Jul. 21, 1975, abandoned.

[30] Foreign Application Priority Data

Jul. 20, 1974 [JP] Japan .................. 49-83581

[51] Int. Cl.² .............................................. C08K 5/11
[52] U.S. Cl. ............................. 260/31.4 R; 260/31.6; 260/42.24; 260/42.45; 260/42.46; 260/42.57

[58] Field of Search ................. 260/42.46, 31.6, 42.57, 260/31.4 R, 42.24, 42.45

[56] References Cited

U.S. PATENT DOCUMENTS

| 2,359,749 | 10/1944 | Collins | 260/31.6 |
| 2,485,592 | 10/1949 | Griess et al. | 260/31.6 |
| 3,627,723 | 12/1968 | Kealy et al. | 260/42.57 |
| 3,767,444 | 10/1973 | Zeisberger | 260/42.57 |

Primary Examiner—James H. Derrington
Attorney, Agent, or Firm—Flynn & Frishauf

[57] ABSTRACT

Composition for extrusion molding comprising a blend of 90 to 30 weight percent of thermoplastic resin and 10 to 70 weight percent of inorganic filler and a modifier selected from sorbitan fatty acid esters and polyoxyethylene sorbitan fatty acid esters in an amount of 0.1 to 5 parts by weight based upon 100 parts by weight of the blend.

8 Claims, No Drawings

THERMOPLASTIC RESIN COMPOSITION SUITABLE FOR EXTRUSION MOLDING

This is a continuation of application Ser. No. 597,560, filed Jul. 21, 1975, now abandoned.

BACKGROUND OF THE INVENTION (a) Field of the Invention

The present invention relates to a composition for extrusion molding, comprising a blend of from 90 to 30 weight percent of a thermoplastic resin and from 10 to 70 weight percent of an inorganic filler, and a modifier selected from sorbitan fatty acid esters and polyoxyethylene sorbitan fatty acid esters in an amount of from 0.1 to 5.0 parts by weight based upon 100 parts by weight of the blend.

(b) Description of the Prior Art

It has been well known that a mixture of a thermoplastic resin and an inorganic filler is an excellent material for various types of molding. However, when such a mixture is utilized as a fiber by hot drawing a melt-extruded strand, it has specific disadvantages. Deposition of residual resin composition (so-called discharge) around the nozzle of a die and yellowing (deterioration due to oxidation of resin) are observed. This deposition causes end breakage and results in cessation of continuous operation, and subsequently an extensive reduction in production efficiency. Furthermore, filaments thus obtained are poor in stretch and cannot be stretched highly. Therefore, such a mixture has limited usage due to unevenness of denier and difficulty in fine deniering.

SUMMARY OF THIS INVENTION

It is an object of this invention to provide a composition for extrusion molding and substantially free of the foregoing disadvantages.

In accordance with this invention, there is provided a composition comprising a blend of from 90 to 30 weight percent of a thermoplastic resin and from 10 to 70 weight percent of an inorganic filler, and a modifier selected from the group of a sorbitan fatty acid ester and a polyoxyethylene sorbitan fatty acid ester in an amount of 0.1 to 5.0 parts by weight based upon 100 parts by weight of the blend.

Compositions of the present invention do not cause deposits around a die nozzle and yellowing when they are applied to an extrusion molding. Also, no end breakage is observed during operation.

DETAILED DESCRIPTION OF THE INVENTION

Thermoplastic resins used in the present invention can be selected from a group of conventional resins including polyethylene and polypropylene.

Inorganic fillers include calcium fillers such as calcium carbonate, calcium sulfate and calcium sulfite; talc and clays.

Blends of these materials are of the range of 90–30 weight percent of thermoplastic resin and 10–70 weight percent of inorganic filler. When the percentage of thermoplastic resin exceeds the above range, remarkable defects are not observed due to effect on molding caused by inorganic filler is small. However, when the percentage of filler exceeds the above range, good molding ability is difficult to obtain.

As a modifier added to the blends of thermoplastic resin and inorganic filler, sorbitan fatty acid esters such as sorbitan mono-laurate, sorbitan monooleate, sorbitan sesquioleate and sorbitan dioleate, and polyoxyethylene fatty acid esters having polymerization degree of 4 to 25 at a portion of oxyethylene group such as polyoxyethylene sorbitan monooleate, polyoxyethylene sorbitan dioleate, polyoxyethylene sorbitan trioleate, polyoxyethylene sorbitan mono- (di- or tri-) palmitate and polyoxyethylene sorbitan mono- (di- or tri-) stearate, can be used. These modifiers can be used singly or in combinations of two or more.

The modifiers are added in amounts of from 0.1 to 5.0 parts by weight, based upon 100 parts by weight of the above-mentioned blend. When the amount of modifier exceeds said range, harmful influences such as bleeding and difficulty in melt milling result. On the other hand, when the amount is less than the said range, desired results cannot be obtained.

Compositions of the present invention can be prepared by mixing prescribed amounts of one or more thermoplastic resins and one or more inorganic fillers, and then adding a prescribed amount of one or more modifier to the resulting mixture and mixing them to form a uniform dispersion. Alternatively, the said three components can be mixed in prescribed amounts at the same time and then dispersed evenly. Conventional mixers such as a Banbury mixer, extruder, intermixer and a mixing roll can be used successfully for mixing the components of the compositions.

A mixture thus obtained is molded into pellets after melting the mixture above the melting point of the thermoplastic resin used and subsequently milling the mixture thoroughly. The pellets are used successfully as a material for extrusion molding such as extrusion molding, tubular film process, stretching filament molding, and blow molding. An extruder having a wire netting of 60–100 mesh can also be used in order to remove extraneous materials, if necessary.

Compositions of the present invention do not cause deposits or yellowing upon extrusion molding and thus no end breakage is observed, resulting in a continuous spinning operation. Filaments thus obtained have many advantages such as excellent stretch, no unevenness of denier and provide very fine deniering.

The present invention is described in detail by means of the following illustrative, but non-limiting, examples. In the Examples, polyoxyethylene fatty acid esters having polymerization degree of 20 at a portion of oxyethylene group are used as polyoxyethylene fatty acid esters.

EXAMPLE 1

Polyoxyethylene sorbitan trioleate (0.5 part by weight) was added to 100 parts by weight of a composition comprising 50 weight percent of polyethylene and 50 weight percent of calcium carbonate, and mixing the resulting mixture thoroughly. Subsequently, the mixture was molded to pellets. Then the pellets were subjected to melt spinning using an extruder with a die having a screw of 50 mm. in diameter and 72 holes of 1 mm. in diameter under the conditions of output rate of 23–25 kg./hr. and die temperature of 255° C. The filaments so obtained were cooled by introducing them into water maintained at 30° C. Subsequently, filaments were subjected to stretch of about 16 fold in warm water (at 95° C.) and then were annealed by hot air maintained at 120°–130° C. When the above operation was made continuously, deposits around the outlets of the die nozzle and yellowing were observed very slightly after 180 minutes of spinning, but no increase of deposits was observed thereafter. Furthermore, only one end breakage was observed during a 50 hour operation. Filaments thus obtained had a fineness of 630 denier and almost no uneven denier was observed.

The above-mentioned polyoxyethylene sorbitan trioleate was replaced by the same amount of polyoxyethylene sorbitan monolaurate, polyoxyethylene sorbitan monopalmitate, and polyoxyethylene sorbitan monooleate, respectively, in corresponding polyethylene/calcium carbonate mixtures. The same spinning procedure as described above was followed. In all cases, deposits around the outlet of the die nozzle and yellowing were negligible and frequency of end breakage during a 50 hour period was none, one, and none, respectively. Furthermore, fineness of filaments was 625, 619 and 627 denier, respectively. All of the above filaments exhibited almost no unevenness of denier.

EXAMPLE 2

Polyoxyethylene sorbitan monostearate (0.5 part by weight) was added to 100 parts by weight of composition comprising 60 weight percent of polyethylene and 40 weight percent of calcium carbonate. The resulting mixture was mixed thoroughly. Subsequently, the mixture was molded to pellets. The pellets were subjected to the same process as described in Example 1 and filaments were obtained. After 220 minutes of operation, slight deposits and yellowing were observed, but no further increase of them was seen thereafter. During a 50 hour operation, no end breakage was observed. Filaments thus obtained showed almost no unevenness of denier and had a fineness of 606 denier.

The amount of said polyoxyethylene sorbitan monostearate was increased to 1.0 part by weight and the same procedure was repeated. After 180 minutes of operation, slight deposits and yellowing were observed and the deposits became ring-type after 240 minutes. However, bending of a strand was not observed. During a 10 hour operation, there was only one end breakage. Filaments thus obtained had a fineness of 705 denier and showed almost no unevenness of denier.

EXAMPLE 3

Various amounts of polyoxyethylene sorbitan monostearate in ranges of 0.05-5.0 parts by weight were added to 100 parts by weight of a composition comprising 50 weight percent of polyethylene and 50 weight percent of calcium carbonate. The same procedure was carried out as described in Example 1. Results are shown in Table 1.

As shown clearly in Table 1, the desired results were not obtained when the amount of the modifier was less than 0.1 part by weight based on 100 parts by weight of the composition.

EXAMPLE 4

Polyoxyethylene sorbitan monostearate (0.5 part by weight) was added to 100 parts by weight of a composition comprising 50 weight percent of polyethylene and 50 weight percent of inorganic filler. The resulting mixture was subjected to spinning as described in Example 1. Results are shown in Table 2.

EXAMPLE 5

Predetermined amounts of various modifiers were added to 100 parts by weight of a composition comprising 50 weight percent of polyethylene and 50 weight percent of calcium carbonate. The resulting mixture was made into pellets which were subjected to spinning as described in Example 1. Results are shown in Table 3.

COMPARATIVE EXAMPLE

To 100 parts by weight of a composition comprising 50 weight percent of polyethylene and 50 weight percent of calcium carbonate, various additives different from the modifiers used in the present invention were added in an amount of 0.5 part by weight. The resulting mixtures were made into pellets which were subjected to the same procedure as described in Example 1. Results are shown in Table 4.

Table 1

| No. | Amounts Added (parts by weight) | Frequency of End Breakage (number/50 hrs) | Extensibility (magnification) | Fineness Denier | Unevenness of Denier | Occurrence of Deposits and Yellowing |
| --- | --- | --- | --- | --- | --- | --- |
| 1 | 0.05 | 11 | 12 | 1115 | many | observed after 40 min. and became ring-type after 60 min., resulting in bending of strand; |
| 2 | 0.1 | 3 | 14 | 855 | slightly | observed after 60 min. and became ring-type after 180 min., but no bending of strand was observed; |
| 3 | 1.0 | 1 | 16 | 633 | almost none | observed slightly after 200 min., but no further increase of deposits was observed; |
| 4 | 3.0 | 0 | 16 | 627 | almost none | observed slightly after 220 min., but no further increase in deposits was observed; |
| 5 | 5.0 | 0 | 16 | 625 | almost none | observed slightly after 230 min., but no further increase of deposits was observed. |

Table 2

| No. | Filler | Frequency of End Breakage (numbers/50 hrs) | Extensibility (magnification) | Fineness Denier | Unevenness of Denier | Occurrence of Deposits and Yellowing |
| --- | --- | --- | --- | --- | --- | --- |
| 1 | $CaSO_3$ | 1 | 16 | 625 | almost none | observed slightly after 150 min. and became ring-type after 200 min., but no bending of strand was observed; |

Table 2-continued

| | | Results of Spinning | | | | |
|---|---|---|---|---|---|---|
| | | Frequency of | | Fineness | | |
| No. | Filler | End Breakage (numbers/50 hrs) | Extensibility (magnification) | Denier | Unevenness of Denier | Occurrence of Deposits and Yellowing |
| 2 | Talc | 0 | 16 | 639 | almost none | observed slightly after 150 min., but no further increase of deposits was observed; |
| 3 | Clay | 0 | 16 | 644 | almost none | observed slightly after 150 min., but no further increase of deposits was observed. |

Table 3

| | | | Results of Spinning | | | | |
|---|---|---|---|---|---|---|---|
| | | | Frequency of | | Fineness | | |
| No. | Modifier | Amounts | End Breakage (numbers/50 hrs) | Extensibility (magnification) | Denier | Unevenness of Denier | Occurrence Deposits and Yellowing |
| 1 | Sorbitan monolaurate | 0.5 | 2 | 16 | 755 | slightly | observed slightly after 60 min. and became ring-type after 100 min., but no bending of strand was observed; |
| 2 | Sorbitan monooleate | 0.5 | 3 | 16 | 746 | slightly | observed slightly after 60 min. and became ring-type after 90 min., but no bending of strand was observed; |
| 3 | Sorbitan monooleate | 1.0 | 2 | 16 | 710 | slightly | observed slightly after 80 min. and became ring-type after 140 min., but no bending of strand was observed; |
| 4 | Sorbitan sesquioleate | 0.5 | 3 | 16 | 726 | slightly | observed slightly after 60 min. and became ring-type after 100 min., but no bending of strand was observed |

Table 4

| | | Results of Spinning | | | | |
|---|---|---|---|---|---|---|
| | | Frequency of | | Fineness | | |
| No. | Modifier | End Breakage (numbers/10 hrs) | Extensibility (magnification) | Denier | Unevenness of Denier | Occurrence of Deposits and Yellowing |
| 1 | Stearic acid monoglyceride | 6 | 16 | 843 | many | observed slightly after 50 min. and became ring-type after 70 min., resulting in bending of strand; |
| 2 | Caprylic acid monoglyceride | 8 | 16 | 876 | many | observed slightly 30 min. and became ring-type after 40 min., resulting in bending of strand; |
| 3 | Oleic acid monoglyceride | 7 | 16 | 850 | many | observed slightly 30 min. and became ring-type after 40 min., resulting in bending of strand; |
| 4 | Calcium stearate | 15* | 12 | 1040 | many | observed slightly 20 min. and became ring-type after 40 min., resulting in bending of strand; |
| 5 | Polyethylene glycol | 20** | 11 | 1195 | many | observed slightly 20 min. and became ring-type after 40 min., resulting in bending of strand. |

*nozzle was cleaned every 5 hrs.
**nozzle was cleaned every 2 hrs.

What is claimed is:

1. A resin composition for the production of filaments by extrusion molding without substantial deposit of residual resin composition on a die employed for said extrusion and without substantial yellowing thereof, consisting essentially of a blend of from 90 to 30 weight percent of a thermoplastic resin and from 10 to 70 weight percent of an inorganic filler, and a modifier selected from the group consisting of a sorbitan fatty acid ester and a polyoxyethylene sorbitan fatty acid ester in an amount of from 0.1 to 5.0 parts by weight based upon 100 parts by weight of the blend, the thermoplastic resin being selected from the group consisting of polyethylene and polypropylene, said inorganic filler being selected from the group consisting of calcium carbonate, calcium sulfate, calcium sulfite, talc and clay.

2. The composition according to claim 1, wherein the modifier is one selected from the group consisting of sorbitan monolaurate, sorbitan monooleate, sorbitan sesquioleate, sorbitan dioleate, polyoxyethylene sorbitan monooleate, polyoxyethylene sorbitan dioleate, polyoxyethylene sorbitan trioleate, polyoxyethylene sorbitan monopalmitate, polyoxyethylene sorbitan dipalmitate, polyoxyethylene sorbitan tripalmitate, polyoxyethylene sorbitan monostearate, polyoxyethylene sorbitan distearate, polyoxyethylene sorbitan tristearate and mixtures thereof.

3. The composition according to claim 1, wherein the thermoplastic resin is polyethylene.

4. The composition according to claim 1, wherein the inorganic filler is calcium carbonate.

5. The composition according to claim 1, wherein the polyoxyethylene sorbitan fatty acid is polyoxyethylene sorbitan trioleate.

6. The composition according to claim 1, wherein the polyoxyethylene sorbitan fatty acid is polyoxyethylene sorbitan monostearate.

7. The composition according to claim 1, wherein the sorbitan fatty acid ester is sorbitan monolaurate.

8. The composition according to claim 1, comprising
polyethylene: 50 – 60 parts by weight
calcium carbonate: 50 – 40 parts by weight
and said modifier.

* * * * *